(12) United States Patent
Li et al.

(10) Patent No.: US 9,965,994 B2
(45) Date of Patent: May 8, 2018

(54) DATA LINE SHARE (DLS) ARRAY SUBSTRATES AND THE DISPLAY DEVICES THEREOF FOR REDUCING SIGNAL DELAY

(71) Applicant: Shenzhen China Star Optoelectronics Technology Co., Ltd., Shenzhen, Guangdong (CN)

(72) Inventors: Qianqian Li, Guangdong (CN); Je-hao Hsu, Guangdong (CN); Zhenya Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 160 days.

(21) Appl. No.: 14/904,934

(22) PCT Filed: Dec. 28, 2015

(86) PCT No.: PCT/CN2015/099137
§ 371 (c)(1),
(2) Date: Jan. 13, 2016

(87) PCT Pub. No.: WO2017/071055
PCT Pub. Date: May 4, 2017

(65) Prior Publication Data
US 2017/0229054 A1    Aug. 10, 2017

(30) Foreign Application Priority Data
Oct. 29, 2015   (CN) .......................... 2015 1 0716769

(51) Int. Cl.
*G09G 3/20*    (2006.01)

(52) U.S. Cl.
CPC ... *G09G 3/2092* (2013.01); *G09G 2310/0262* (2013.01); *G09G 2320/0223* (2013.01)

(58) Field of Classification Search
CPC ......... G09G 3/2092; G09G 2320/0223; G09G 2310/0262
See application file for complete search history.

(56) References Cited

U.S. PATENT DOCUMENTS 8,026,883 B2    9/2011  Meng et al.
9,217,905 B2 *  12/2015 Xia ...................... G09G 3/3648
(Continued)

FOREIGN PATENT DOCUMENTS

CN   101216649 A   7/2008
CN   103529614 A   1/2014
(Continued)

*Primary Examiner* — Ryan A Lubit
(74) *Attorney, Agent, or Firm* — Andrew C. Cheng

(57) ABSTRACT

The array substrate includes a substrate and at least one display pixel arranged on the substrate. The display pixel includes a plurality of first pixels and a plurality of second pixels arranged along a row direction and a column direction. The period along the row direction or the column direction includes three display pixels. Wherein within at least one period along the row direction and the column direction, the display pixel of the first row includes one second pixel and two first pixels adjacent to the second pixel. The display pixel of the second row includes one first pixel and two second pixels adjacent to the first pixel. The display pixel of the third row includes one first pixel and two second pixels adjacent to the first pixel, and the first pixel of the third row is in different column from the first pixel of the second row.

8 Claims, 2 Drawing Sheets

(56) References Cited

U.S. PATENT DOCUMENTS

| | | | |
|---|---|---|---|
| 2005/0046620 A1 | 3/2005 | Lee et al. | |
| 2008/0024408 A1 | 1/2008 | Sano et al. | |
| 2008/0122876 A1 | 5/2008 | Meng et al. | |
| 2009/0179906 A1* | 7/2009 | Moon | G09G 3/3648 345/531 |
| 2010/0149157 A1* | 6/2010 | Shih | G02F 1/13624 345/211 |
| 2012/0300133 A1* | 11/2012 | Saitoh | G09G 3/3607 348/731 |
| 2013/0135183 A1* | 5/2013 | Kimura | H01L 27/3216 345/76 |
| 2013/0335306 A1* | 12/2013 | Liu | G09G 3/3233 345/76 |
| 2014/0362064 A1 | 12/2014 | Kuo et al. | |
| 2016/0131954 A1 | 5/2016 | Li et al. | |
| 2016/0246134 A1 | 8/2016 | Chen | |
| 2016/0247822 A1 | 8/2016 | Chen et al. | |
| 2016/0275888 A1 | 9/2016 | Chen et al. | |
| 2016/0334684 A1 | 11/2016 | Li et al. | |

FOREIGN PATENT DOCUMENTS

| | | |
|---|---|---|
| CN | 104267519 A | 1/2015 |
| CN | 104280962 A | 1/2015 |
| CN | 105206182 A | 12/2015 |

\* cited by examiner

US 9,965,994 B2

DATA LINE SHARE (DLS) ARRAY SUBSTRATES AND THE DISPLAY DEVICES THEREOF FOR REDUCING SIGNAL DELAY

BACKGROUND OF THE INVENTION

1. Field of the Invention

The present disclosure relates to display technology, and more particularly to an DLS array substrate and the display device thereof.

2. Discussion of the Related Art

In display technology, scanning lines and data lines arranged on display devices cooperatively operate with each other to realize display functions and to switch between the image. Generally, the scanning lines are arranged horizontally, and the data lines are arranged vertically. Wherein the number of the scanning lines and the data lines are the same with the number of the rows and the columns of the sub-pixels matrix, which ensure the display control of each of the sub-pixels. However, such configuration may results in surplus data lines, and the charging period of the sub-pixels may be too long.

Basing on the conventional configuration, data line share (DLS) solution has been proposed, wherein the adjacent sub-pixel utilizes different scanning lines may share the same data line. The advantage of such solution resides in that the number of the data line may be reduced to half of the original number, and the charging period of the sub-pixels may be greatly decreased when the number of the scanning lines is increased.

When the display device displays the images, usually, the dot inversion method is adopted. That is, the polarity of the signals of two adjacent data lines are opposite to each other. At the same time, the resistance of the data line may cause the signals transmitted thereon delay. As such, the signals are not of ideal square wave, and the pixels charged later may have better charging performance. Although DLS may resolve the issues, such as surplus data lines and long charging period of the sub-pixels, but this solution may accelerate the signals delay. Even, dark and bright lines may occur in the display images so as to affect the display performance.

SUMMARY

The object of the invention is to provide an DLS array substrate and the display device thereof to alleviate the signals delay effect.

In one aspect, a data line share (DLS) array substrate includes: a substrate and at least one display pixel arranged on the substrate, the display pixel includes a plurality of first pixels and a plurality of second pixels arranged along a row direction and a column direction, the first pixel and the second pixel share the same data line but connect to different scanning lines; the first pixels and the second pixels are arranged periodically along the row direction and the column direction, and the period along the row direction or the column direction includes three display pixels; wherein within at least one period along the row direction and the column direction, the display pixel of the first row includes one second pixel and two first pixels adjacent to the second pixel; the display pixel of the second row includes one first pixel and two second pixels adjacent to the first pixel; and the display pixel of the third row includes one first pixel and two second pixels adjacent to the first pixel, and the first pixel of the third row is in different column from the first pixel of the second row.

Wherein within two adjacent periods along a horizontal direction, a first scanning line and a second line are respectively arranged at a top side and a down side of the display pixels of the first row, the period of the first row includes the first pixel, the first pixel, the second pixel, the first pixel, the first pixel, and the second pixel, the first pixels are controlled by the second scanning line via a switch to connect with the corresponding data line, the second pixels are controlled by the first scanning line via one switch to connect with the corresponding data line; wherein a first data line, a second data line, a third data line, and a fourth data line are arranged along the column direction, in the first row, the first pixel in the first column utilizes the first data line, the first pixel in the second column and the second pixel in the third column share the second data line, the first pixel in the fourth column and the second pixel in the sixth column share the third data line, and the first pixel in the fifth column utilize the fourth data line; a third scanning line and a fourth scanning line are respectively arranged at a top side and a down side of the display pixels of the second row, the period of the second row includes the second pixel, the second pixel, the first pixel, the second pixel, the second pixel, and the first pixel, the first pixels are controlled by the fourth scanning line via the switch to connect with the corresponding data line, the second pixels are controlled by the third scanning line via the switch to connect with the corresponding data line; wherein within the second row, the second pixel of the first column utilizes the first data line, the second pixel of the second column and the first pixel of the third column share the second data line, the second pixel of the fourth column and the first pixel of the sixth column share the third data line, and the second pixel of the fifth column utilizes the fourth data line; a fifth scanning line and a sixth scanning line are respectively arranged at a top side and a down side of the display pixels of the third row, the period of the third row includes the first pixel, the second pixel, the second pixel, the first pixel, the second pixel, and the second pixel, the first pixels are controlled by the sixth scanning line via one switch to connect with corresponding data lines, the second pixels are controlled by the fifth scanning line via one switch to connect with corresponding data lines; and wherein in the third row, the first pixel of the first column and the second pixel of the third column share the second data line, the second pixel of the second column utilizes the first data line, the first pixel of the fourth column and the second pixel of the fifth column share the third data line, and the second pixel of the sixth column utilizes the fourth data line.

Wherein the switch is a thin film transistor (TFT).

Wherein the switch is a N-type TFT.

In another aspect, a display device includes: an array substrate including a substrate and at least one display pixel arranged on the substrate, the display pixel includes a plurality of first pixels and a plurality of second pixels arranged along a row direction and a column direction, the first pixel and the second pixel share the same data line but connect to different scanning lines; the first pixels and the second pixels are arranged periodically along the row direction and the column direction, and the period along the row direction or the column direction includes three display pixels; wherein within at least one period along the row direction and the column direction, the display pixel of the first row includes one second pixel and two first pixels adjacent to the second pixel; the display pixel of the second row includes one first pixel and two second pixels adjacent to the first pixel; and the display pixel of the third row includes one first pixel and two second pixels adjacent to the first pixel, and the first pixel of the third row is in different column from the first pixel of the second row.

Wherein within two adjacent periods along a horizontal direction, a first scanning line and a second line are respectively arranged at a top side and a down side of the display pixels of the first row, the period of the first row includes the first pixel, the first pixel, the second pixel, the first pixel, the first pixel, and the second pixel, the first pixels are controlled by the second scanning line via a switch to connect with the corresponding data line, the second pixels are controlled by the first scanning line via one switch to connect with the corresponding data line; wherein a first data line, a second data line, a third data line, and a fourth data line are arranged along the column direction, in the first row, the first pixel in the first column utilizes the first data line, the first pixel in the second column and the second pixel in the third column share the second data line, the first pixel in the fourth column and the second pixel in the sixth column share the third data line, and the first pixel in the fifth column utilize the fourth data line; a third scanning line and a fourth scanning line are respectively arranged at a top side and a down side of the display pixels of the second row, the period of the second row includes the second pixel, the second pixel, the first pixel, the second pixel, the second pixel, and the first pixel, the first pixels are controlled by the fourth scanning line via the switch to connect with the corresponding data line, the second pixels are controlled by the third scanning line via the switch to connect with the corresponding data line; wherein within the second row, the second pixel of the first column utilizes the first data line, the second pixel of the second column and the first pixel of the third column share the second data line, the second pixel of the fourth column and the first pixel of the sixth column share the third data line, and the second pixel of the fifth column utilizes the fourth data line; a fifth scanning line and a sixth scanning line are respectively arranged at a top side and a down side of the display pixels of the third row, the period of the third row includes the first pixel, the second pixel, the second pixel, the first pixel, the second pixel, and the second pixel, the first pixels are controlled by the sixth scanning line via one switch to connect with corresponding data lines, the second pixels are controlled by the fifth scanning line via one switch to connect with corresponding data lines; and wherein in the third row, the first pixel of the first column and the second pixel of the third column share the second data line, the second pixel of the second column utilizes the first data line, the first pixel of the fourth column and the second pixel of the fifth column share the third data line, and the second pixel of the sixth column utilizes the fourth data line.

Wherein the switch is a thin film transistor (TFT).

Wherein the switch is a N-type TFT.

In view of the above, the first pixels and the second pixel are arranged in a manner wherein one period includes three display pixels. With respect to any one of the columns and rows, one period includes at least one first pixel and at least one second pixel. In this way, the density of the bright pixels or the dark pixels is reduced, and the bright and dark lines issue resulting from the signals delay effect may be alleviated.

DETAILED DESCRIPTION OF THE EMBODIMENTS

Embodiments of the invention will now be described more fully hereinafter with reference to the accompanying drawings, in which embodiments of the invention are shown.

Figure 1:
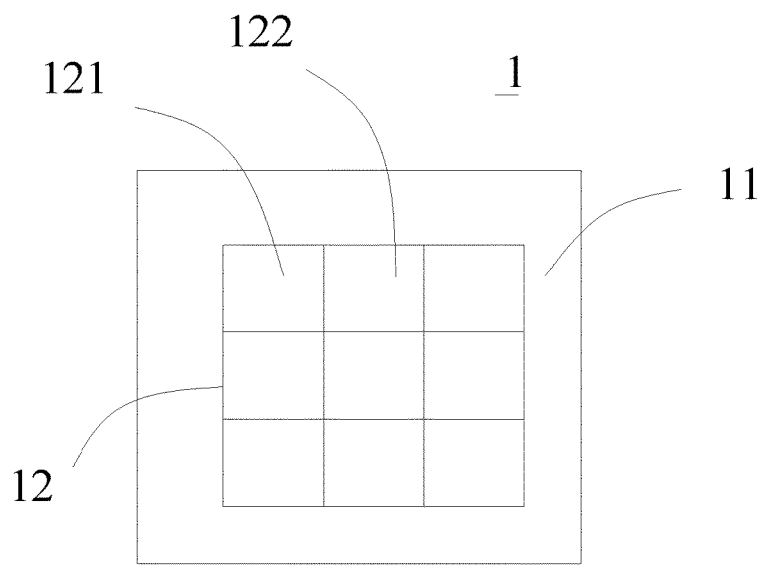
FIG. 1 is a schematic view of the DLS array substrate in accordance with one embodiment.
Figure 2:
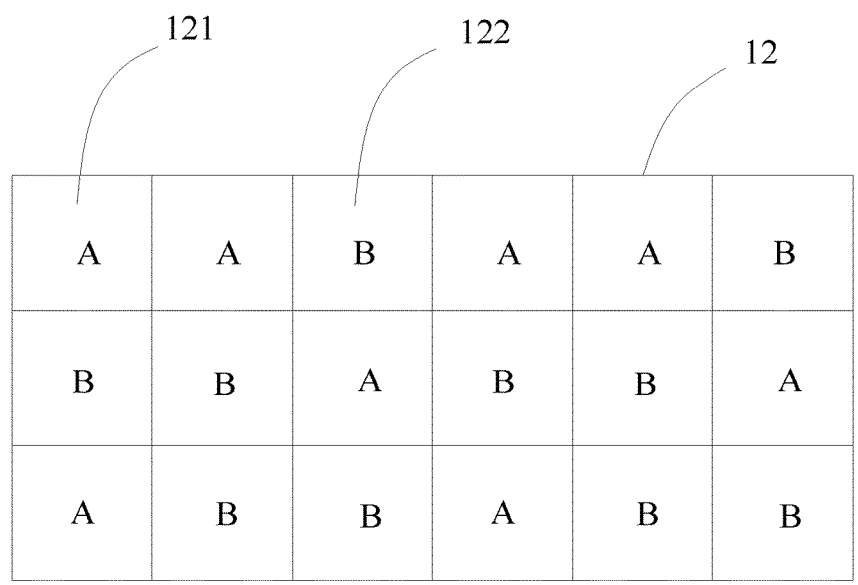
FIG. 2 is a schematic view of one example of the DLS array substrate in accordance with one embodiment.

FIGS. 1 and 2 are schematic views of the DLS array substrate in accordance with one embodiment. The array substrate 1 includes a substrate 11 and at least one display pixel 12. The display pixel 12 includes a plurality of first pixels 121 and a plurality of second pixels 122 arranged in rows and columns. The first pixel 121 and the second pixel 122 are two display pixels sharing the same data line but connecting to different scanning lines. The first pixels 121 and the second pixels 122 are periodically arranged along the row direction and the along the column direction. The period along the row direction and along the column direction includes three display pixels. Within at least one period along the row direction and the column direction, the display pixel 12 of the first row includes a second pixel 122 and at two first pixels 121 adjacent to the second pixels 122, the display pixel 12 of the second row includes a first pixels 121 and two second pixels 122 adjacent to the first pixels 121, the display pixel 12 of the third row includes a first pixels 121 and two second pixels 122 adjacent to the first pixels 121, and the first pixel of the third row is in different column from the first pixel of the second row. In FIG. 2, the first pixels and the second pixels are respectively shown as A and B within the period.

One period includes nine display pixels 12 arranged in three rows and in three columns. The first pixel 121 and the second pixels 122 share the same data line. That is, any one of the rows or any one of the columns includes at least one first pixel 121 or second pixel 122 such that the first pixel 121 and the second pixel 122 are interleaved with each other. The distribution of the first pixel 121 and the second pixel 122 is more uniform such that the brightness of the display pixels of each of the periods is uniform. In this way, the signals delay effect regarding the DLS may be alleviated, and the bright and dark lines issue may be overcome.

Figure 3:
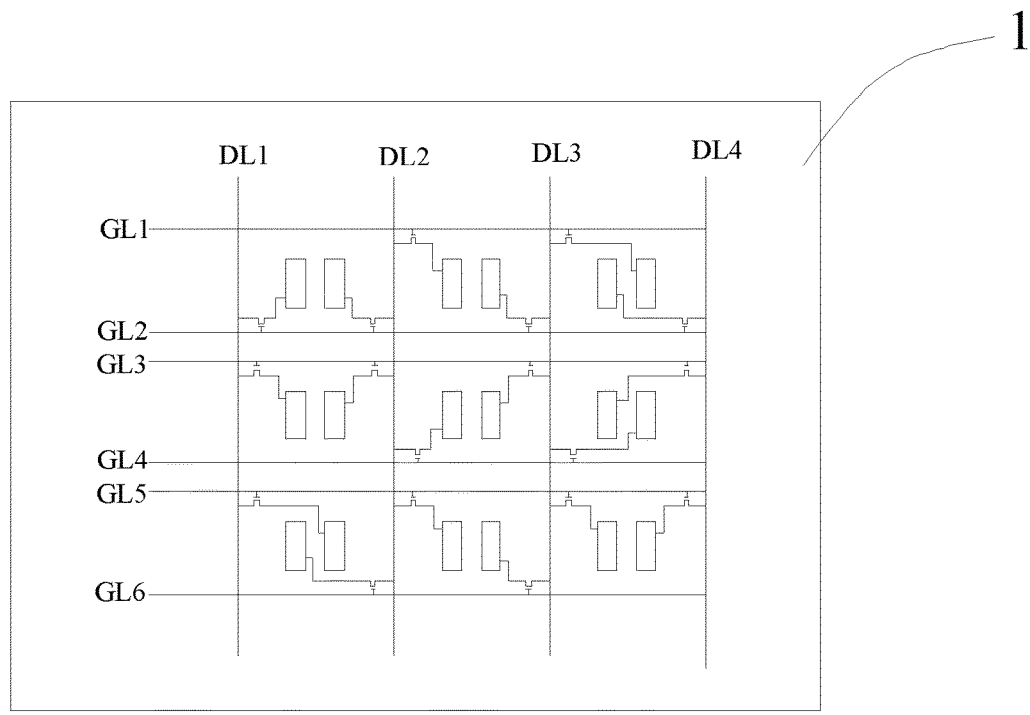
FIG. 3 is a schematic view of the circuit of FIG. 2.

Referring to FIGS. 2 and 3, with respect to the two adjacent periods along the horizontal direction, a first scanning line and a second line are respectively arranged at a top side and a down side of the display pixels of the first row. In addition, the period of the first row includes the first pixel, the first pixel, the second pixel, the first pixel, the first pixel, and the second pixel. The first pixels are controlled by the second scanning line (GL2) via a switch to connect with the corresponding data line, the second pixels are controlled by the first scanning line (GL1) via one switch to connect with the corresponding data line. The first data line (DL1), the second data line (DL2), the third data line (DL3), and the fourth data line (DL4) are arranged along the column direction. In the first row, the first pixel in the first column utilizes the first data line (DL1), the first pixel in the second column and the second pixel in the third column share the second data line (DL2), the first pixel in the fourth column and the second pixel in the sixth column share the third data line (DL3), and the first pixel in the fifth column utilize the fourth data line (DL4).

A third scanning line (GL3) and a fourth scanning line (GL4) are respectively arranged at a top side and a down side of the display pixels of the second row. The period of the second row includes the second pixel, the second pixel, the first pixel, the second pixel, the second pixel, and the first pixel. The first pixels are controlled by the fourth scanning line (GL4) via the switch to connect with the corresponding data line, and the second pixels are controlled by the third scanning line (GL3) via the switch to connect with the corresponding data line. Within the second row, the second pixel of the first column utilizes the first data line (DL1), the second pixel of the second column and the first pixel of the third column share the second data line (DL2), the second pixel of the fourth column and the first pixel of the sixth column share the third data line (DL3), and the second pixel of the fifth column utilizes the fourth data line (DL4).

A fifth scanning line (GL5) and a sixth scanning line (GL6) are respectively arranged at a top side and a down side of the display pixels of the third row. The period of the third row includes the first pixel, the second pixel, the second pixel, the first pixel, the second pixel, and the second pixel. The first pixels are controlled by the sixth scanning line (GL6) via one switch to connect with corresponding data lines, and the second pixels are controlled by the fifth scanning line (GL5) via one switch to connect with corresponding data lines. In the third row, the first pixel of the first column and the second pixel of the third column share the second data line (DL2), the second pixel of the second column utilizes the first data line (DL1), the first pixel of the fourth column and the second pixel of the fifth column share the third data line (DL3), and the second pixel of the sixth column utilizes the fourth data line (DL4).

The switch may be a thin film transistor (TFT), which is energy-saving and may be easily integrated. In one example, the switch may a N-type TFT.

Figure 4:
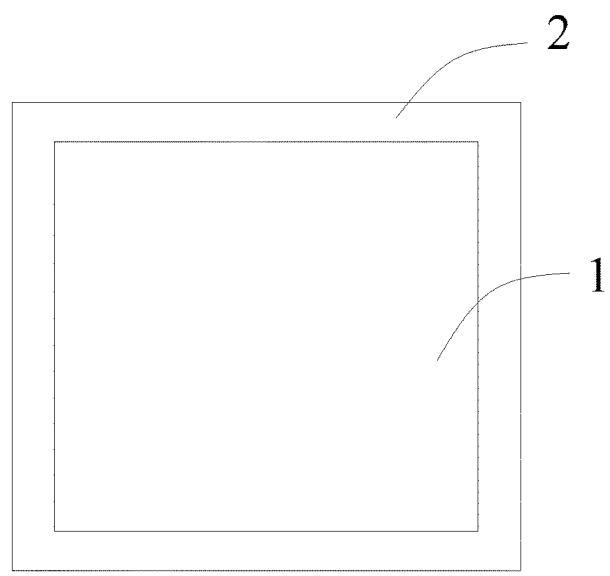
FIG. 4 is a schematic view of the DLS array substrate in accordance with another embodiment.

FIG. 4 is a schematic view of the DLS array substrate in accordance with another embodiment. The display device 2 includes the DFS array substrate 1 that may alleviate the signals delay effect so as to reduce the bright and dark lines issue. By adopting the array substrate 1, the display performance is good, wherein the bright and dark pixels are uniformly distributed, and the dark and brightness may not be easily observed so as to obtain better display performance.

In view of the above, the first pixels and the second pixel are arranged in a manner wherein one period includes three display pixels. With respect to any one of the columns and rows, one period includes at least one first pixel and at least one second pixel. In this way, the density of the bright pixels or the dark pixels is reduced, and the bright and dark lines issue resulting from the signals delay effect may be alleviated.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A data line share (DLS) array substrate, comprising:
a substrate and each of pixel periods comprising three sub-pixels arranged along both a row direction and a column direction arranged periodically on the substrate, the sub-pixels comprising first sub-pixels and the second sub-pixels, and the first sub-pixel and the second sub-pixel sharing one data line but connecting to different scanning lines;

wherein the pixel period of a first row comprises two consecutive first sub-pixels and one second sub-pixel adjacent to the first sub-pixels;

wherein the pixel period of a second row comprises two consecutive second sub-pixels and one first sub-pixel adjacent to the first sub-pixels;

wherein the pixel period of a third row comprises one first sub-pixel and two consecutive second sub-pixels adjacent to the first sub-pixel; and wherein the first sub-pixel of the pixel period of the third row is in different column from the first sub-pixel of the pixel period of the second row.

2. The DLS array substrate as claimed in claim 1, wherein each of the pixel periods of the first row are arranged between two scanning lines, the first sub-pixels in the first row are controlled by the scanning line arranged below the first row via a switch to connect with the corresponding data line, the second sub-pixels are controlled by the scanning line arranged above the first row via one switch to connect with the corresponding data line;

wherein a first data line, a second data line, a third data line, and a fourth data line are arranged along the column direction, in the first row, the first sub-pixel in the first column utilizes the first data line, the first sub-pixel in the second column and the second sub-pixel in the third column share the second data line, the first sub-pixel in the fourth column and the second sub-pixel in the sixth column share the third data line, and the first sub-pixel in the fifth column utilize the fourth data line;

wherein each of the pixel periods of the second row are arranged between two scanning lines, the first sub-pixels in the second row are controlled by the scanning line arranged below the second row via the switch to connect with the corresponding data line, the second sub-pixels are controlled by the third scanning line via the switch to connect with the corresponding data line;

wherein within the second row, the second sub-pixel of the first column utilizes the first data line, the second sub-pixel of the second column and the first sub-pixel of the third column share the second data line, the second sub-pixel of the fourth column and the first sub-pixel of the sixth column share the third data line, and the second sub-pixel of the fifth column utilizes the fourth data line;

wherein each of the pixel periods of the third row are arranged between two scanning lines, the first sub-pixels in the third row are controlled by the scanning line arranged below the third row via the switch to connect with the corresponding data line, the second sub-pixels are controlled by the third scanning line via the switch to connect with the corresponding data line; and wherein within the third row, the first sub-pixel of the first column and the second sub-pixel of the third column share the second data line, the second sub-pixel of the second column utilizes the first data line, the first sub-pixel of the fourth column and the second sub-pixel of the fifth column share the third data line, and the second sub-pixel of the sixth column utilizes the fourth data line.

3. The DLS array substrate as claimed in claim 2, wherein the switch is a thin film transistor (TFT).

4. The DLS array substrate as claimed in claim 3, wherein the switch is a N-type TFT.

5. A display device, comprising:
an array substrate comprising:

a substrate and each of pixel periods comprising three sub-pixels arranged along both a row direction and a column direction arranged periodically on the substrate, the sub-pixels comprising first sub-pixels and the second sub-pixels, and the first sub-pixel and the second sub-pixel sharing one data line but connecting to different scanning lines;

wherein the pixel period of a first row comprises two consecutive first sub-pixels and one second sub-pixel adjacent to the first sub-pixels;

wherein the pixel period of a second row comprises two consecutive second sub-pixels and one first sub-pixel adjacent to the first sub-pixels;

wherein the pixel period of a third row comprises one first sub-pixel and two consecutive second sub-pixels adjacent to the first sub-pixel; and wherein the first sub-pixel of the pixel period of the third row is in different column from the first sub-pixel of the pixel period of the second row.

6. The display device as claimed in claim 5, wherein each of the pixel periods of the first row are arranged between two scanning lines, the first sub-pixels in the first row are controlled by the scanning line arranged below the first row via a switch to connect with the corresponding data line, the second sub-pixels are controlled by the scanning line arranged above the first row via one switch to connect with the corresponding data line;

wherein a first data line, a second data line, a third data line, and a fourth data line are arranged along the column direction, in the first row, the first sub-pixel in the first column utilizes the first data line, the first sub-pixel in the second column and the second sub-pixel in the third column share the second data line, the first sub-pixel in the fourth column and the second sub-pixel in the sixth column share the third data line, and the first sub-pixel in the fifth column utilize the fourth data line;

wherein each of the pixel periods of the second row are arranged between two scanning lines, the first sub-pixels in the second row are controlled by the scanning line arranged below the second row via the switch to connect with the corresponding data line, the second sub-pixels are controlled by the third scanning line via the switch to connect with the corresponding data line;

wherein within the second row, the second sub-pixel of the first column utilizes the first data line, the second sub-pixel of the second column and the first sub-pixel of the third column share the second data line, the second sub-pixel of the fourth column and the first sub-pixel of the sixth column share the third data line, and the second sub-pixel of the fifth column utilizes the fourth data line;

wherein each of the pixel periods of the third row are arranged between two scanning lines, the first sub-pixels in the third row are controlled by the scanning line arranged below the third row via the switch to connect with the corresponding data line, the second sub-pixels are controlled by the third scanning line via the switch to connect with the corresponding data line; and wherein within the third row, the first sub-pixel of the first column and the second sub-pixel of the third column share the second data line, the second sub-pixel of the second column utilizes the first data line, the first sub-pixel of the fourth column and the second sub-pixel of the fifth column share the third data line, and the second sub-pixel of the sixth column utilizes the fourth data line.

7. The display device as claimed in claim 6, wherein the switch is a thin film transistor (TFT).

8. The display device as claimed in claim 7, wherein the switch is a N-type TFT.

* * * * *